Oct. 1, 1963  S. N. ZARRILLO  3,105,949
SMALL ELECTRICAL CONTROL DEVICE
Filed Feb. 7, 1961

INVENTOR.
Salvatore N. Zarrillo
BY
Kane, Dalsimer and Kane

United States Patent Office 3,105,949
Patented Oct. 1, 1963

3,105,949
SMALL ELECTRICAL CONTROL DEVICE
Salvatore N. Zarrillo, Salmon Falls, N.H., assignor to Clarostat Mfg. Co., Inc., Dover, N.H., a corporation of New York
Filed Feb. 7, 1961, Ser. No. 87,612
2 Claims. (Cl. 338—174)

This invention relates generally to an electrical control device and more particularly to a small radial control device which will not be damaged when turned through its extreme end position.

A control device referred to as a potentiometer consists essentially of a resistance section and a contact arm whose radial or angular position determines the position of the potentiometer or control device. There are potentiometers in existence today which are of the so-called single turn type which are such that rotation of a mechanical member 360° results in a 360° rotation of the contact arm. There are other types in which several or many complete rotations of a mechanical member is necessary in order to rotate the contact arm from one extremity of its electrical travel to the other. Control devices of this type generally have in common the provision of a stop means which will engage the electrical moving component of the device and prevent it from moving through the extreme electrical position. This presents a serious problem especially in small electrical control devices since the stop means must be sufficiently strong to prevent the turning of the electrical moving member beyond the stop position even if the mechanical moving member or the drive member is turned through the stop position. The problem is acute in small devices in which the limitations as to size inherently limit the structural material available to strengthen the stop so that it is a frequent occurrence in small electrical control devices of the radial type for the stop to be broken when the mechanical driving member is rotated through the extreme position.

The invention herein disclosed has as its principal object the furnishing of a small electrical control device of the radial potentiometer type which is light in weight and one which is provided with a stop and designed so that the stop will not be broken if the mechanical driving member is turned through its extreme position.

A further object of this invention is to provide a small electrical control device which will stop electrically but will allow for continuous harmless mechanical turning of the driving member.

The invention disclosed herein is described in terms of a potentiometer by way of example only and it should be understood that the inventive concept set forth herein can be applied by one reasonably skilled in the art to other variable parameter control devices whose value is altered by rotation of a mechanical driving member.

A small electrical control device embodying the invention and the manner of using the same is described herein with references to the drawings in which.

Figure 1:
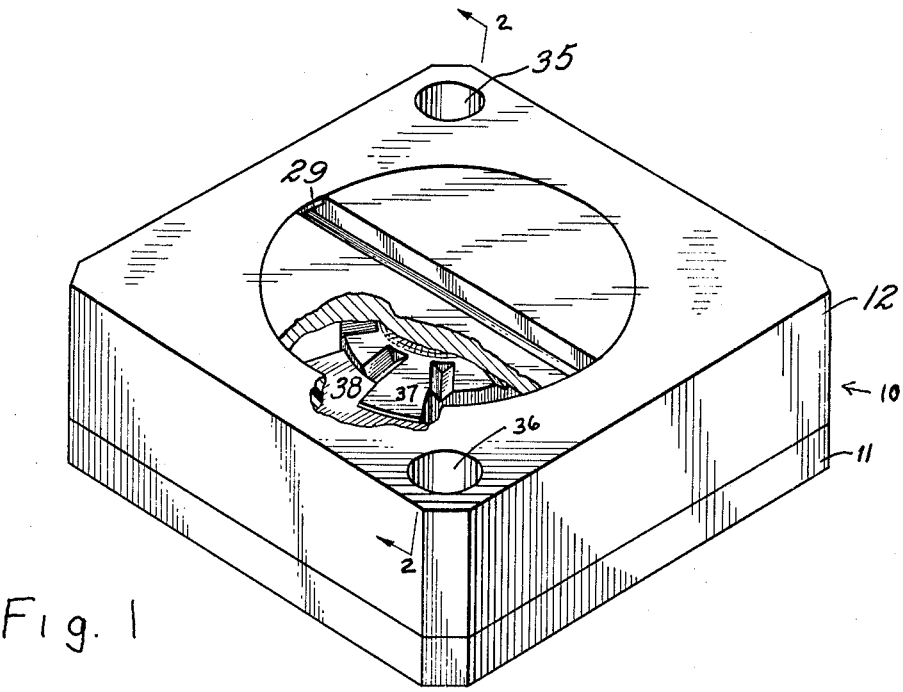
FIG. 1 is a top perspective view of a small electrical control device constructed in accordance with the teachings of this invention, with portions thereof cut away to disclose certain of the internal details.

The electrical control device which is the subject of this invention is indicated in FIG. 1 and designated therein by the numeral 10. It is made up of a base portion 11 and a top or body portion 12. The device 10 is small and has a substantially square horizontal cross-section with rectangular vertical cross-sections. Base 11 as well as body or cover portion 12 is formed from a phenolic or other suitable electrical non-conducting material.

Upper surface 13 of base 11 is formed with a circular channel 14 of square or rectangular cross-section. Circumferential groove 14 is formed to receive therein winding 15 which is an electrical resistance winding. Circular slot 16 is formed in the upper surface 13 and centrally thereof to receive therein collector ring 17, which is a circular disk of the type commonly used for this purpose, formed of an electrical conducting material. Disk 17 is cemented in recess 16 provided therefor and the electrical resistance wire 15 is cemented in groove 14. Collector ring 17 and electrical resistance wire 15 are arranged concentrically, and both of these members have the upper surface thereof exposed so that they can be engaged by contact members 18 and 19. Contact member 19 is in the form of a brush which contacts the electrical resistance wire 15 and which can traverse the same upon being rotated as will be explained below. Contact 18 is in the form of a bead and is continually in contact with collector 17 in the final assembly. Contacts 18 and 19 are electrically connected to each other and mechanically attached in the assembly by means of spring wire 20. Spring wire 20 is fastened to contact carrying member 21 which is substantially circular in horizontal cross-section and which is mounted in the assembly above collector 17 so that in the final assembly spring member 20 is in fact resiliently maintained between the contact carrier 21 to which it is rigidly attached and thereby prevented from relative rotational motion with respect thereto and the collector and coil. The spacing of the contact carrier 21 in the final assembly from the collector ring and the resistance coil is selected so that the contact members 18 and 19 are yieldingly urged against their respective contact surfaces by the resilient spring action of spring member 20 which is rigidly fastened to contact carrier 21.

Member 12 of the control is formed with a cylindrical hollowed-out portion indicated generally by the numeral 22 in the figures so that there is ample space for the contacts and spring member 20. An additional cylindrical hollowed-out portion 23 is formed therein of smaller diameter than hollowed-out portion 22 to receive contact carrier 21 therein. As seen in the figures and especially in FIG. 2, the cylindrical hollowed-out portion 22 is formed at the lower surface 24 of member 12 and cylindrical hollowed-out portion 23 is formed directly above hollow 22 and each has the same central vertical axis.

An additional cylindrical hollow 25 is formed in member 12 to receive driver member 26 as shown in the figures. Driver member 26 is a disk-like member formed of any suitable rigid or substantially rigid material and has a depending projection 27 which is received in central slot 28 of the carrier member 21. Projection 27 and central slot 28 are both substantially cylindrical and have concentric vertical axis which vertical axis is the central axis of the contact carrier member 21 and the driver member 26. Additionally, driver member 26 is formed with a transverse slot 29 in the upper surface thereof to receive a screwdriver blade, in order to rotate the driver member 26 by means of a screwdriver, if it is desired. The upper surface of member 12 is formed with shoulders 30 and 31 which overlie a corresponding peripheral track 32 formed in the upper surface of driver member 26 and maintain the same within the assembly and prevent the driver 26 from being forced upwardly out of the assembly due to the resiliency of the spring member 20.

The periphery of the upper surface of the contact carrier member 21 is formed with a series of radial serrations which converge toward the center. Each of the serrations is formed with inclined sides, the incline being about 45° from the vertical so that the bottom of each serration is defined by a single straight line and each of these single straight lines is directed toward the center of contact carrier 21. In the drawings, each serration is designated by the numeral 33. The lower surface of the driver member 26 has projecting therefrom one or more depending projections 34 which is designed to be received within a single serration 33 when the projection 34 is in position to be received by the same. In the figures, the embodiment of the invention disclosed utilizes two depending projections and each is designated by the numeral 34. However, it should be understood that one or more projections 34 can be utilized in the practice of this invention. The projections are set on a circumference which has the same radial dimension as the circumference upon which the serrations are set.

Both members 11 and 12 are formed with vertical cylindrical slots indicated in the figures by the numerals 35 and 36 to receive screw members which maintain body members 11 and 12 together as well as fastening the final assembly of the device 10 to a surface.

Figure 2:
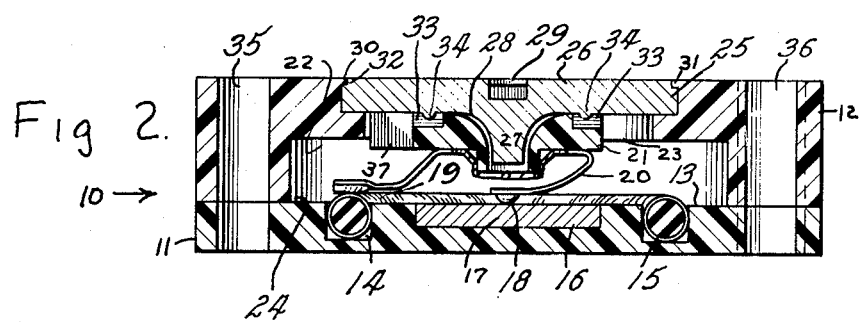
FIG. 2 is a sectional view taken along the line 2—2 in the direction of the arrows as indicated in FIG. 1.

When assembled, as seen best in FIG. 2, the maintaining of the driver member 26 in the assembly and the utilization of spring contact 20, which is attached to contact carrier 21, yieldingly urges contact carrier 21 upwardly toward driver member 26 and yieldingly urges corresponding serrations 33 and depending projections 34 into operative contact with one another. The resiliency of contact spring 20 is such that the application of a screwdriver blade to slot 29 and rotation thereof or the rotation of driver member 26 by any other suitable means will result in the rotation of contact carrier 21 and the corresponding rotation of contact member 19 so that it sweeps the electrical resistance wire 15. In such an assembly, however, if for any reason contact carrier 21 is prevented from rotation the driver member 26 can be continually rotated freely since there will be a ratchet action between the serrations 33 and projections 34 due to the resiliency of wire 20.

The advantage of such a construction becomes obvious when the control device is equipped with mechanical stops. The device which is the subject of this invention is equipped with corresponding mechanical stops 37 and 38. Stop 37 is a moving stop which in effect is a radial projection outwardly formed on the contact carrier 21. Stop 38 is a stationary stop which is an inwardly directed radial projection formed on upper body portion 12 of the control device. The utilization of mechanical stops is extremely important in a device of this type. It is often very important, depending on the particular design, that the contact member 19 in contact with resistance coil 15 be limited so that it can traverse the coil once and not be allowed to continually rotate through and beyond 360°. In certain installations it is desirable that there be a beginning and an end to the travel of the electrical portion of the assembly. The provision of stops 37 and 38 enables the device to be equipped with an electrical beginning and an electrical end, and the design of the device is such that upon stops 37 and 38 encountering one another, continual rotation of driver member 26 can have no rotational effect upon contact carrier 21 so that driver member 26 is allowed to rotate relatively freely with stop 37 in contact with 38 so that the carrier member 21 and brush 19 cannot rotate. Such a design results in the prevention of breaking of stops and further enables the designer to utilize the electrical features of the device without being handicapped by the necessity for precision driving equipment. Such advantages are found in large electrical control devices but because of the lack of material with which to develop a rugged stop, small electrical control devices have, for the most part, necessitated precise orientation of mechanical and electrical portions thereof. With the design which is the subject of this invention such precise and costly orientation is unnecessary.

Figure 3:
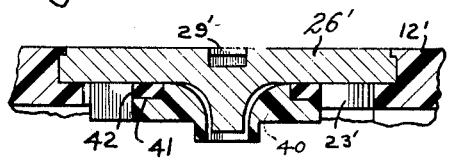
FIG. 3 is a segmentary view of an alternate embodiment of the device.

An alternate form of the invention is shown in FIG. 3 wherein a portion of the device of FIG. 2 is shown equipped with a modification. In FIG. 3 the driver member is indicated by the numeral 26′, the upper body portion of the device is indicated by the numeral 12′, the circumferential hollow corresponding to the circumferential hollow of FIG. 2 is indicated by the numeral 23′, and the screw slot formed in the driver member is indicated by the numeral 29′. Each of these numerals designates a portion of the device shown in FIG. 2 which corresponds exactly to the portion of the device which is in FIGS. 1 and 2. However, the design of FIG. 3 is modified so that the contact carrier member 40 shown therein is not formed with serrations but rather is formed with a peripheral slot or track 41 in which is inserted a friction disk formed of a suitable frictional material, such as cork or rubber, and which is indicated in FIG. 3 by the numeral 42. The contact member 26′ does not have downwardly directed projections nor does the contact carrier have serrations. In the absence of projections and serrations, friction disk 42 enables a frictional force to be created which impedes the relative rotation of driver member 26′ and contact carrier 40 so that rotation of driver member 26′ will enable the spring member of the assembly of FIG. 3 which would correspond to the spring member 20 in FIG. 2 to rotate, however, the force developed between members 26′ and 40 is not sufficient to prevent relative rotation of the same upon the prevention of rotation of contact carrier 40 when it is impeded from motion by stops such as the stops 37 and 38 of FIGS. 1 and 2. The spring member serves the same purpose in this assembly; that of yieldingly urging the contact carrier member 40 upwardly toward the driver 26′ so that the frictional disk is in contact with the driver member 26′ as well as in contact with contact carrier 40. The friction disk may be cemented in peripheral groove 41 if it is so desired. However, under certain applications this may not be necessary.

Thus, among others, the several objects in the invention, as specifically aforenoted, are achieved. Obviously, numerous changes in construction and rearrangement of parts might be resorted to without departing from the spirit of the invention as defined by the claims.

I claim:

1. In an electrical control device, a resistance winding circumferentially arranged, a collector member concentric with said resistance wire, an electrically conductive spring member electrically connecting said resistance winding and said collector, a driver member, a support for said driver member rotatably supporting the same, a carrier member disposed between said driver member and said spring member, said spring member yieldingly urging said carrier member toward said driver member and said spring member, said carrier member being restrained from relative rotational movement, ratchet means cooperatively associated with said driver member and said carrier member and linking the same whereby rotation of said driver member can rotate said carrier member and said driver member can rotate freely upon condition of non-rotation of said carrier member.

2. An electrical control device in accordance with claim 1 in which the device is provided with a casing having an inwardly directed radial projection formed to cooperate with an outwardly directed radial projection of said carrier member to provide means preventing rotation of said carrier member upon abutment of said projections.

References Cited in the file of this patent

UNITED STATES PATENTS

| | | |
|---|---|---|
| 1,773,609 | Yoshiyasu | Aug. 19, 1930 |
| 2,069,440 | Hathorn | Feb. 2, 1937 |
| 2,172,011 | Lodge | Sept. 5, 1939 |
| 2,509,058 | Haury | May 23, 1950 |
| 2,722,585 | Mucher | Nov. 1, 1955 |
| 2,880,293 | Blanco | Mar. 31, 1959 |